(12) United States Patent
Pitera et al.

(10) Patent No.: US 11,396,063 B2
(45) Date of Patent: Jul. 26, 2022

(54) SYSTEMS AND METHODS FOR IN PROCESS HEATING FOR DIRECT ENERGY DEPOSITION APPLICATIONS

(71) Applicant: Rosemount Aerospace Inc., Burnsville, MN (US)

(72) Inventors: Rudy Pitera, Woodbury, MN (US); Scott Wigen, Eagan, MN (US); Paul Robert Johnson, Prior Lake, MN (US); Ryan Philip Chou, Richfield, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 253 days.

(21) Appl. No.: 16/827,159

(22) Filed: Mar. 23, 2020

(65) Prior Publication Data

US 2021/0291299 A1    Sep. 23, 2021

(51) Int. Cl.
| | |
|---|---|
| *B33Y 10/00* | (2015.01) |
| *B33Y 30/00* | (2015.01) |
| *B23K 26/34* | (2014.01) |
| *B23K 26/342* | (2014.01) |
| *B23K 26/70* | (2014.01) |
| *B23K 13/01* | (2006.01) |
| *B23K 26/14* | (2014.01) |
| *H05B 6/06* | (2006.01) |
| *H05B 6/10* | (2006.01) |

(52) U.S. Cl.
CPC ............ *B23K 26/342* (2015.10); *B23K 13/01* (2013.01); *B23K 26/1464* (2013.01); *B23K 26/702* (2015.10); *B33Y 10/00* (2014.12); *B33Y 30/00* (2014.12); *H05B 6/06* (2013.01); *H05B 6/101* (2013.01)

(58) Field of Classification Search
CPC   B33Y 10/00; B33Y 30/00; B23K 26/34–342; B23K 15/0086
See application file for complete search history.

(56) References Cited

U.S. PATENT DOCUMENTS

| | | |
|---|---|---|
| 9,073,150 B2 | 7/2015 | Graichen |
| 10,335,856 B2 | 7/2019 | Swaminathan et al. |

(Continued)

FOREIGN PATENT DOCUMENTS

| | | |
|---|---|---|
| CN | 103624259 A | 3/2014 |
| CN | 107756798 A | 3/2018 |

(Continued)

OTHER PUBLICATIONS

Extended European Search Report for EP Application No. 21164414.1, dated Jul. 26, 2021, 10 pages.

(Continued)

*Primary Examiner* — Michael A Laflame, Jr.
(74) *Attorney, Agent, or Firm* — Kinney & Lange, P.A.

(57) ABSTRACT

A system used to additively manufacture an object layer-by-layer using direct energy deposition (DED) includes a base where the object is formed, a depositor configured to deposit material layer-by-layer on the base or a previously deposited layer of the object, an energy source configured to selectively direct an energized beam at the material to fuse a new layer of the material to a previously formed layer, and a heating element in contact with at least a portion of the base and configured to supply heat to the base.

15 Claims, 5 Drawing Sheets

(56) References Cited

U.S. PATENT DOCUMENTS

| | | | |
|---|---|---|---|
| 2015/0298212 A1* | 10/2015 | Hann | C22C 32/00 |
| | | | 419/12 |
| 2017/0051386 A1* | 2/2017 | Carter | B22F 5/04 |
| 2017/0209923 A1* | 7/2017 | Giovan | C22C 19/057 |
| 2018/0133958 A1 | 5/2018 | Niitani et al. | |
| 2018/0169938 A1 | 6/2018 | Inenaga et al. | |
| 2018/0187636 A1* | 7/2018 | Okamoto | B23K 26/123 |
| 2018/0311727 A1* | 11/2018 | Willmann | B29C 64/371 |
| 2018/0318961 A1* | 11/2018 | Yamamoto | B23K 26/34 |
| 2019/0118252 A1* | 4/2019 | Bauer | B22F 10/10 |
| 2019/0134913 A1 | 5/2019 | Buratto | |
| 2021/0060922 A1* | 3/2021 | Ryon | B22F 10/28 |
| 2021/0162508 A1* | 6/2021 | Narita | B33Y 10/00 |
| 2021/0162651 A1* | 6/2021 | Schweizer | B29C 64/209 |

FOREIGN PATENT DOCUMENTS

| | | |
|---|---|---|
| EP | 2377669 A1 | 10/2011 |
| WO | 2019159635 A1 | 8/2019 |
| WO | WO2019177607 A1 | 9/2019 |

OTHER PUBLICATIONS

Do-Sik Shim, et al., "Effect of substrate preheating by induction heater on direct energy deposition of AISI M4 powder", from Materials Science & Engineering A 682, pp. 550-562, 2017.

\* cited by examiner

SYSTEMS AND METHODS FOR IN PROCESS HEATING FOR DIRECT ENERGY DEPOSITION APPLICATIONS

BACKGROUND

Direct energy deposition (DED) is an additive manufacturing process in which focused thermal energy is used to fuse materials as they are being deposited to produce three-dimensional objects and objects with complex geometries. In DED manufacturing, an industrial laser beam, for example, may be used to form successive layers of material to create or repair objects.

SUMMARY

A system used to additively manufacture an object layer-by-layer using direct energy deposition (DED) includes a base where the object is formed, a depositor configured to deposit material layer-by-layer on the base or a previously deposited layer of the object, an energy source configured to selectively direct an energized beam at the material to fuse a new layer of the material to a previously formed layer, and a heating element in contact with at least a portion of the base and configured to supply heat to the base.

A method of depositing layers onto a base using DED includes heating the base, depositing a layer of material on the base or on a previously deposited layer, providing energy to the material after each layer is deposited, the energy being provided by an energy source that forms an energized beam directed at the material, melting the material with the energized beam, and allowing the material to solidify to bond the material to the base or a previously deposited layer.

DETAILED DESCRIPTION

An improved system and method of direct energy deposition (DED) used for additively manufacturing (or repairing) a three-dimensional (3D) object, or an object with complex geometry, is disclosed herein. The method includes conductive heating (i.e., secondary heating) of a base (i.e., platform, support surface, work piece, or object) during the formation of successive layers of applied material being applied to the base by DED. Rapid heating and cooling during the DED process can lead to rapid expansion/contraction of the applied material and induce stresses within grain structure and potentially result in cracks or distortion of desired geometry. Heating of the base during application of the applied material can improve weldability and reduce stresses, distortion, and deposition defects during the DED process. A base upon which material may be applied can be heated to a temperature that can be greater than ambient temperature, for example, by about 100 to 200 degrees Celsius. Alternatively, a difference in temperature between a heated base and a melting temperature of material being applied to the base can be reduced to about 100 to 200 degrees Celsius. The heat applied conductively, or otherwise, to the base or pre-existing object during the DED process can be used to better control the additive manufacturing process to provide a finished object that has more desirable properties (e.g., increased strength).

Figure 1:
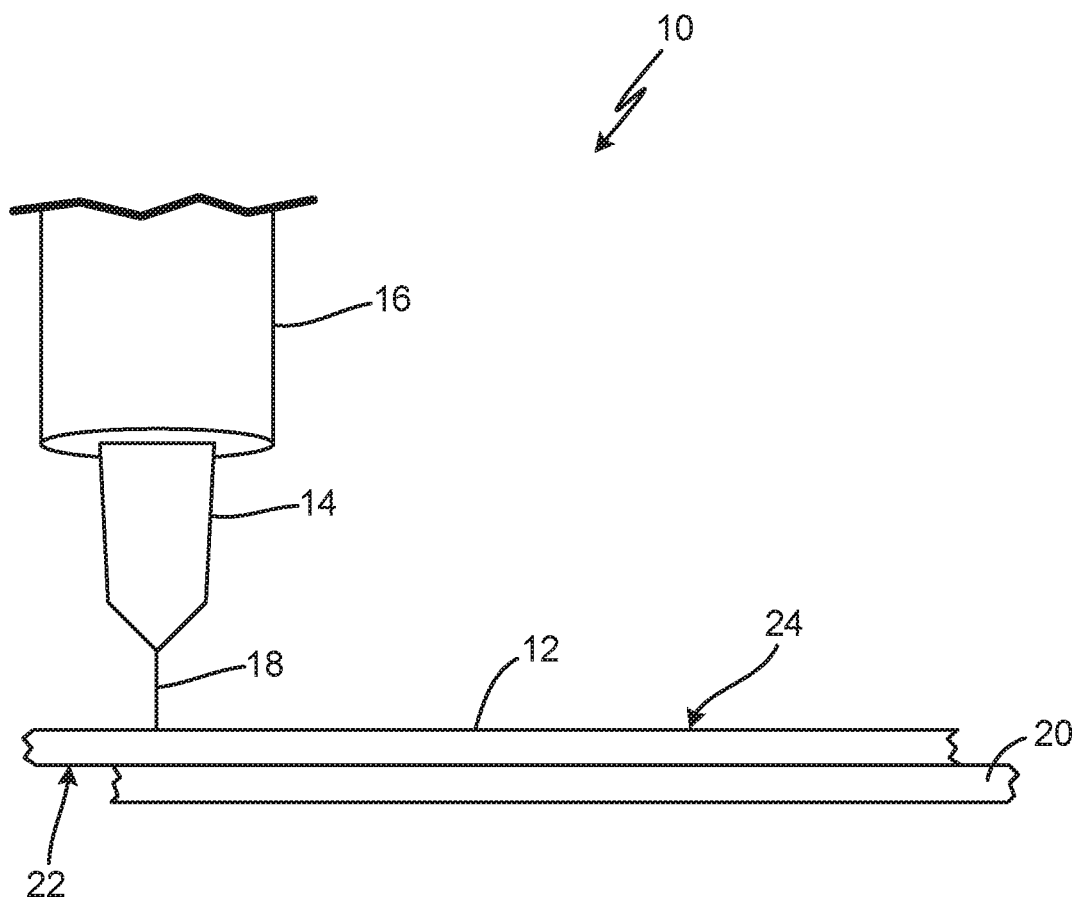
FIG. 1 is a perspective view of a direct energy deposition (DED) system.

FIG. 1 is a perspective view of DED system 10 including conductive heating. DED system 10 includes base 12, depositor 14 (e.g., a nozzle), energizing source 16 that provides energized beam 18, and a material (not shown) to be applied using system 10. Heating element 20 contacts lower surface 22 of base 12 and can conductively heat base 12. In the embodiment shown, heating element 20 contacts lower surface 22 of base 12 that is opposite upper surface 24 where material can be applied or deposited. Other locations of heating element 20 and other amounts of contact between heating element 20 and base 12 of system 10 are contemplated, however, since heat from heating element 20 can be conducted a distance through base 12. Heating element 20 can supply heat to base 12 having a temperature that is 100 to 200 degrees Celsius above ambient temperature or room temperature.

Figure 4:
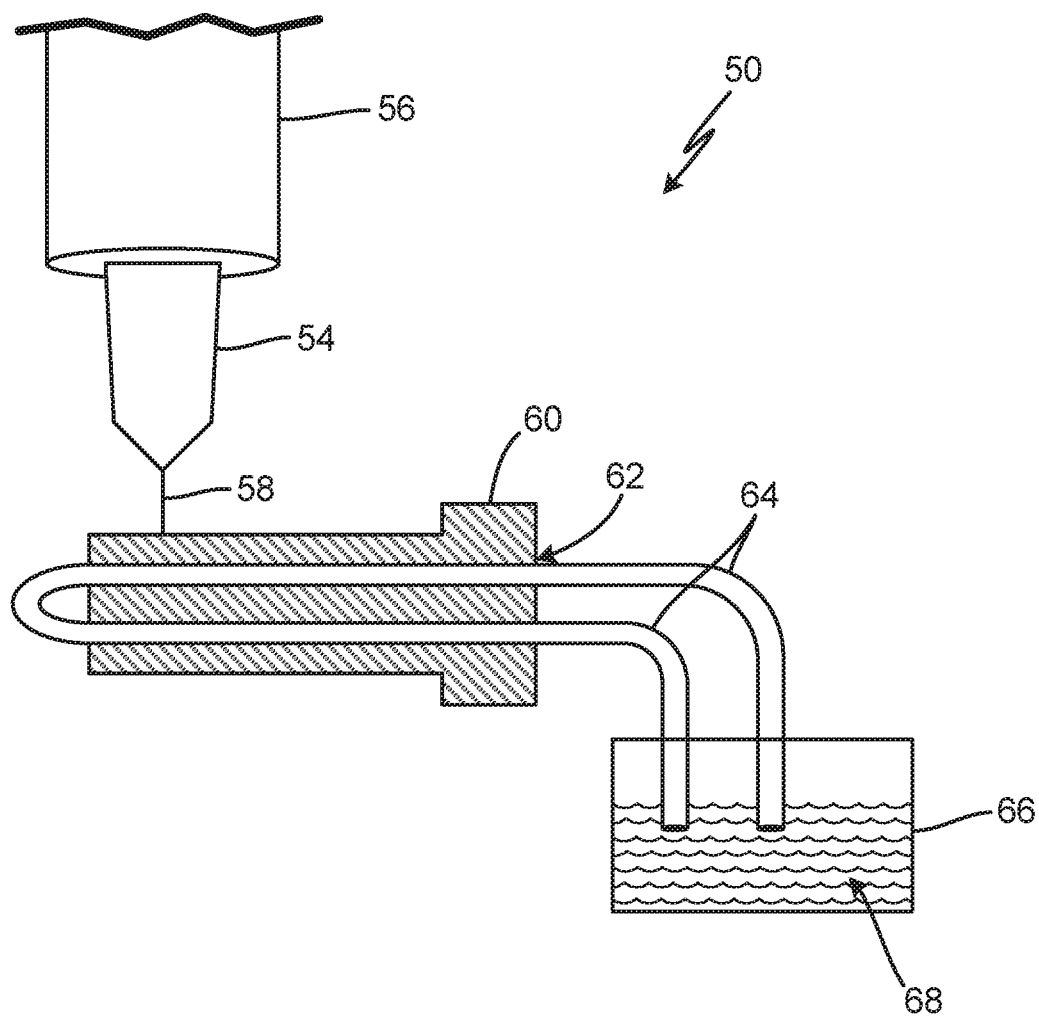
FIG. 4 is a perspective and partial cross-sectional view of a third DED system.

"Base," as used in this application, may be an object having a surface on which a bottom, or first, layer of material can be deposited via DED. The base may be a bed of a system, as shown in DED system 10. Alternatively, base may be a pre-existing component (as shown in FIG. 4 and discussed herein below).

Aside from heating element 20, most components of DED system 10 operate generally as understood in the art. Base 12 (which can be flat, ridged, or have another configuration) provides a surface on which an object (not shown) may be formed layer-by-layer or on which a pre-existing component or object may have layers applied thereto during the additive manufacturing process. The material or feedstock for DED system 10 can be a powder or a wire, for example. In laser-based, powder-fed DED, the material being fused is deposited by blowing metallic powder though small nozzles or orifices into a melt pool created by a laser. In laser-based, wire-fed DED, a wire can be fed off-axis and melted by a laser into a melt pool. In both powder- and wire-fed DED, for example, the material can be a metal (such as titanium), an alloy (such as nickel-based alloys), a composite, or another material (such as various steels) able to be used in additive manufacturing. Energizing source 16 can be any component configured to produce an energized beam 18, which can be a laser or an electron beam, for example, to melt the material deposited on an object to form a melt pool. Energized beam 18 is a path between energizing source 16 and the deposited material along which thermal energy travels. The melt pool is an area of the deposited material and of the object upon which it is deposited that has been liquified by the thermal energy introduced by energized beam 18 and, when allowed to melt and solidify, bonds/fuses a layer of deposited material and/or a previously deposited layer to form an object, for example. Energizing source 16 and/or energized beam 18 can be mobile relative to base 12 to adjust the location at which energized beam 18 forms a melt pool (or vice versa, base 12 can be mobile relative to energizing source 16 and/or energized beam 18). An additive manufacturing process using the DED system 10 can alternatively be performed in containment, which can house/contain a gas. Such a gas can be an inert gas (such as argon) as to reduce the reactivity between the gas and the deposited material during a DED process.

Figure 2:
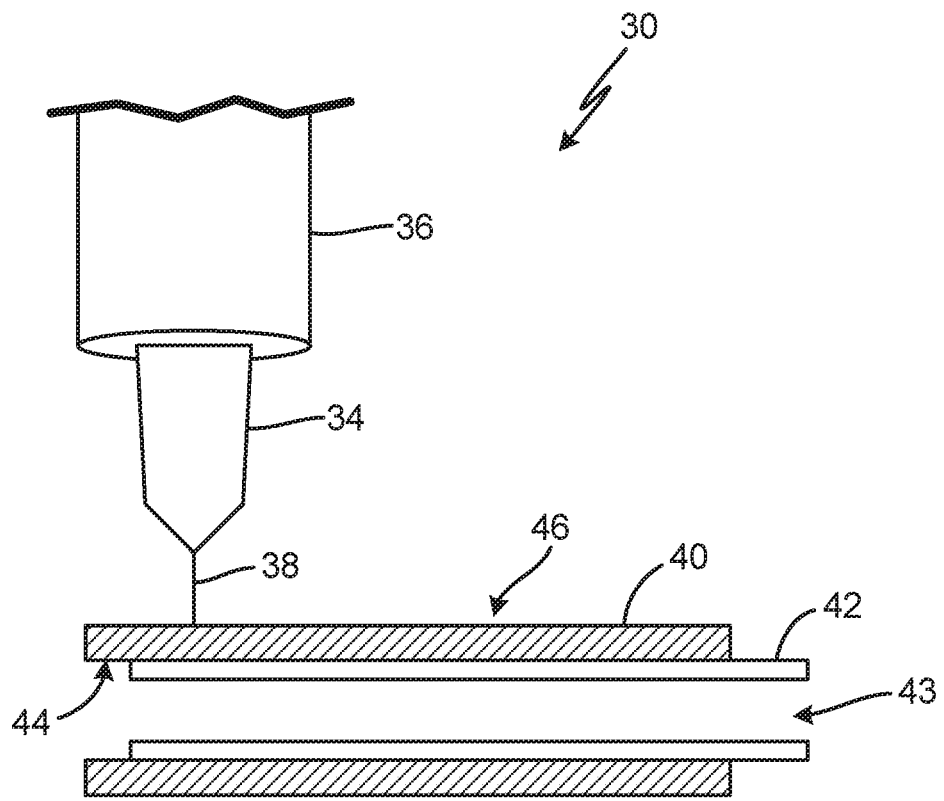
FIG. 2 is a perspective and partial cross-sectional view of a second DED system.
Figure 3:
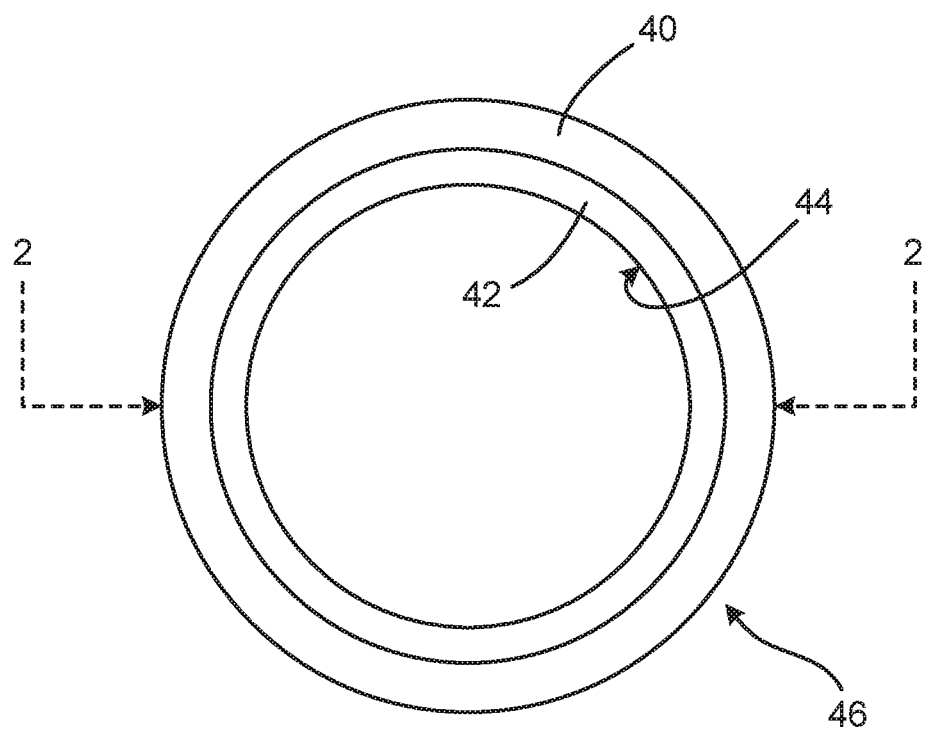
FIG. 3 is an end view of a portion of the second DED system shown in FIG. 2.

FIG. 2 is a perspective and partial cross-sectional view of second DED system 30 including conductive heating. DED system 30 includes depositor 34, energizing source 36 that provides energized beam 38, and a material (not shown) to be applied using DED system 30, for example. DED system 30 also includes tubular base 40 including tubular passageway 43 (one tubular passageway is shown, but base 40 may alternatively include more than one tubular passageway), and heating element 42 that fits within tubular passageway 43 and/or conforms to tubular base 40. Tubular base 40 (e.g., stock rod material) and heating element 42 are shown in cross-section in FIG. 2, with the cross-section being taken along line 2-2 of FIG. 3. FIG. 3 is an end view of tubular base 40 and heating element 42 together. Heating element 42 contacts inner surface 44 of tubular base 40 and can conductively heat tubular base 40. In the embodiment shown in FIGS. 2 and 3, heating element 42 contacts inner surface 44 of tubular base 40 that is opposite outer surface 46 where material is to be applied or deposited. Heating element 42 can be a tubular heating element that fits inside an inner diameter of tubular base 40, as shown. Alternatively, heating element 42 can comprise an induction heating, or coiled resistance heating, element that fits inside or around tubular base 40. In another alternative, heating element 42 can comprise a plurality of tubular heating elements that can be distributed along inner surface 44 of tubular base 40 (e.g., running along the length of tubular base 40). Other exemplary embodiments of heating element 42 of DED system 30 are also contemplated.

Aside from heating element 42, most components of DED system 30 operate generally as understood in the art and as discussed herein with regards to DED system 10 shown in FIG. 1. Additionally, tubular base 40 can rotate with respect to energized beam 38 to adjust the location at which energized beam 38 forms a melt pool (or vice versa, energizing source 36 and/or energized beam 38 can rotate around tubular base 40).

FIG. 4 is a perspective and partial cross-sectional view of third DED system 50 including conductive heating. DED system 50 includes depositor 54, energizing source 56 that provides energized beam 58, and a material (not shown) to be applied using DED system 50, for example. Such components of DED system 50 operate generally as understood in the art and as discussed herein with regards to DED system 10 shown in FIG. 1. DED system 50 can be used to conductively heat preexisting component 60 (e.g., a turbine blade) by running heated fluid through pre-existing component 60. Pre-existing component 60 is shown in cross-section in FIG. 4 in order to show the presence of vanes 62 or other passageways through which tubing 64 can extend. The tubing 64 can be connected to heat-controlled bath 66 in order for heated fluid 68 to be circulated through tubing 64 located within vanes 62 of pre-existing component 60 and conductively heat pre-existing component 60. DED system 50 may also include other components that are not shown, such as a pump to move heated fluid 68. DED system 50 can, for example, be used to deposit layers of material to repair pre-existing component 60.

DED systems 10, 30, 50 described herein can include a control apparatus (not shown) that includes numerous components to control different aspects of the systems. For example, a control apparatus may be used to adjust properties of the energized beam, the heating element, melting of an object and deposited material, pumping of heated fluid, etc.

Figure 5:
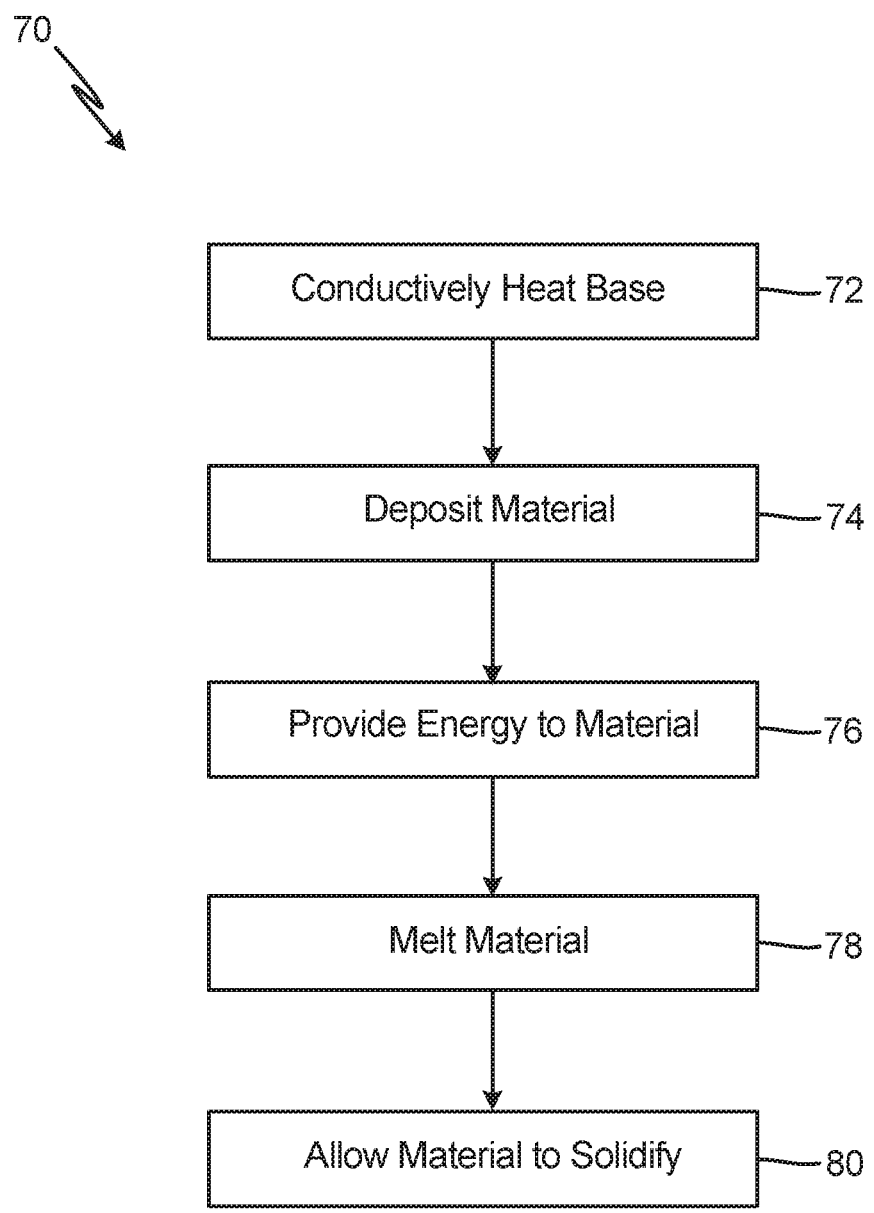
FIG. 5 is a flow chart of a DED process incorporating in process heating.

FIG. 5 is a flow chart of an improved direct energy deposition process 70 using a heating element that can conductively heat a base where deposition takes place using system 10, 30 or 50, for example. Process 70 includes multiple steps 72-80 to construct an object layer-by-layer to form an object with desirable properties or to repair a pre-existing component. Process 70 will also be described with regards to components of DED systems 10, 30 and 50 shown in FIGS. 1-3, as examples.

Step 72 is conductively, or otherwise, heating base 12, for example, in DED system 10. The heating step can be performed before, after and/or during the other steps 74-80 of process 70. It is contemplated that heat can be supplied to base 12 or a pre-existing component, for example, in various ways. Heat may be conducted to base 12 in DED system 10 by contacting base 12 with heating element 20, which is flat as shown. In DED system 30, heating element 42 fits within an inner diameter of tubular base (or passageway) 40, and can be tubular in shape, a coiled resistance heating element, or a plurality of tubular heating elements that extend along length of tubular base 40, for example. In DED system 50, heat can be supplied conductively to pre-existing component 60 via running heated fluid 68 from heat-controlled bath 66 through tubing 64 that extends through passageways 62 that run through pre-existing component 60. Other embodiments of conductively heating a base or pre-existing component in the process of DED are also contemplated.

In an embodiment, the conductively heating step can include heating the base to 100 to 200 degrees Celsius greater than ambient temperature prior to a depositing step (step 74, described below). Alternatively and/or additionally, the conductively heating step can include heating the base to a temperature such that a difference between the temperature of the base and a melting temperature of the material being applied to the base is reduced to 100 to 200 degrees Celsius.

Step 74 is depositing a layer of material (i.e., deposited material) used to construct an object or repair a pre-existing component, for example. The layer of material is deposited on a base (or a previously deposited portion of an existing component) to form an object layer-by-layer. The material can be deposited using depositor 14, and the amount of material deposited at each specified location can vary depending on design considerations and other factors. The depositing of material, with various, different configurations and sub-steps, is known to one of skill in the art. The temperature or heat level of the base can be monitored to determine or ensure that a desired amount of pre-heating of the base over room temperature is reached prior to depositing material on the base. Such monitoring may be performed by a temperature sensor, for example. One or more temperatures sensors can be placed in the system, such as, for example, in contact with the base in order to measure the temperature of the base. In addition, one or more temperature sensors may be placed in an area surrounding the system in order to measure the temperature of the room (or ambient temperature). Temperatures of the base and the surrounding area, as measured by temperature sensors, for example, may be compared using any suitable method or equipment such that a determination can be made as to whether the base is sufficiently heated in order to then proceed to deposit material on the base. After each layer of material is deposited, step 76 includes providing energy to the layer of the material by an energizing source through the use of an energized beam directed at the deposited material.

Step 78 includes melting deposited material with an energized beam to form a melted pool of liquified material and a portion of the pre-existing component or object being formed by process 70. A most recently deposited material layer may be melted along with a portion of a previously deposited layer forming an object. The energy source can be configured to selectively direct an energized beam at the material to fuse a new layer of the material to a previously formed layer.

Finally, in step 80, the melted pool (which includes the liquified deposited material and at least a portion of the previously deposited and previously solidified layers of an object or workpiece) is allowed to solidify to bond/fuse the material to the previous layers of the object (or pre-existing component). Then, if necessary, process 70 is performed again to form another layer of an object or pre-existing component, upon the previously deposited layer.

Discussion of Possible Embodiments

The following are non-exclusive descriptions of possible embodiments of the present invention.

A system used to additively manufacture an object layer-by-layer using direct energy deposition (DED) includes a base where the object is formed, a depositor configured to deposit material layer-by-layer on the base or a previously deposited layer of the object, an energy source configured to selectively direct an energized beam at the material to fuse a new layer of the material to a previously formed layer, and a heating element in contact with at least a portion of the base and configured to supply heat to the base.

The system of the preceding paragraph can optionally include, additionally and/or alternatively, any one or more of the following features, configurations and/or additional components:

The heating element includes a coiled resistance heating element.

The heating element includes a plurality of tubular heating elements.

The base includes a tubular passageway.

The heating element includes a coiled resistance heating element configured and arranged to fit within the tubular passageway.

The heating element includes a plurality of tubular heating elements configured and arranged to fit within the tubular passageway and extend along a length of the tubular passageway.

A temperature of the base is within 100 to 200 degrees Celsius of a melting temperature of the material.

A temperature of the base is 100 to 200 degrees Celsius above ambient temperature.

A system used for direct energy deposition of layers of a material to a pre-existing component using DED includes a depositor configured to deposit material layer-by-layer on the pre-existing component or a previously deposited layer of material on the pre-existing component, an energy source configured to selectively direct an energized beam at the material to fuse a new layer of the material to the pre-existing component or to a previously formed layer on the pre-existing component, and a heating element in contact with at least a portion of the pre-existing component and configured to supply heat to the pre-existing component.

The system of the preceding paragraph can optionally include, additionally and/or alternatively, any one or more of the following features, configurations and/or additional components:

The heating element includes tubing with heated fluid flowing through the tubing, and a heat-controlled bath apparatus connected to the tubing.

A temperature of the pre-existing component is 100 to 200 degrees Celsius above ambient temperature.

A temperature of the pre-exiting component is within 100 to 200 degrees Celsius of a melting temperature of the material.

A method of depositing layers onto a base using DED includes heating the base, depositing a layer of material on the base or on a previously deposited layer, providing energy to the material after each layer is deposited, the energy being provided by an energy source that forms an energized beam directed at the material, melting the material with the energized beam: and, allowing the material to solidify to bond the material to the base or a previously deposited layer.

The method of the preceding paragraph can optionally include, additionally and/or alternatively, any one or more of the following features, configurations, steps and/or additional components:

The heating step is carried out by an induction heating element configured to heat the base.

The induction heating element includes a coiled resistance heating element configured and arranged to fit within or around the base.

The heating step is carried out by a plurality of heating elements configured and arranged to fit within and/or extend along a length of the base.

The heating step includes heating the base to 100 to 200 degrees Celsius greater than ambient temperature prior to the depositing step.

The heating step includes heating the base to a temperature such that a difference between the temperature of the base and a melting temperature of the material being applied to the base is reduced to 100 to 200 degrees Celsius.

The energy source is a laser.

The energy source is an electron beam.

Monitoring heat of the base to determine a temperature of the base prior to the depositing step.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system used to additively manufacture an object layer-by-layer using direct energy deposition (DED), the system comprising:
a base having a first surface where the object is formed, and a second surface disposed on a side of the base opposite the first surface;
a depositor configured to deposit material layer-by-layer on the first surface of the base or a previously deposited layer of the object;
an energy source configured to selectively direct an energized beam at the material to fuse a new layer of the material to a previously formed layer; and
a heating element in direct physical contact with at least a portion of the second surface of the base and configured to conductively supply heat to the base.

2. The system of claim 1, wherein the heating element comprises a plurality of tubular heating elements.

3. The system of claim 1, wherein the base includes a tubular passageway.

4. The system of claim 3, wherein the heating element comprises a plurality of tubular heating elements configured and arranged to fit within the tubular passageway and extend along a length of the tubular passageway.

5. The system of claim 1, wherein a temperature of the base is 100 to 200 degrees Celsius above ambient temperature.

6. The system of claim 1, wherein a temperature of the base is within 100 to 200 degrees Celsius of a melting temperature of the material.

7. A system used for direct energy deposition of layers of a material to repair a pre-existing component using direct energy deposition (DED), the system comprising:
    a depositor configured to deposit material layer-by-layer on the pre-existing component or a previously deposited layer of material on the pre-existing component;
    an energy source configured to selectively direct an energized beam at the material to fuse a new layer of the material to the pre-existing component or to a previously formed layer on the pre-existing component; and
    a heating element extending through passageways within the pre-existing component and configured to supply heat to the pre-existing component, the heating element including heat tubing configured to circulate a heated fluid, and a heat-controlled bath apparatus connected to the tubing.

8. The system of claim 7, wherein a temperature of the pre-existing component is 100 to 200 degrees Celsius above ambient temperature.

9. The system of claim 7, wherein a temperature of the pre-exiting component is within 100 to 200 degrees Celsius of a melting temperature of the material.

10. A method of depositing layers onto a base using direct energy deposition (DED), the method comprising:
    conductively heating the base using a heating element in direct physical contact with a first surface of the base;
    depositing a layer of material on a second surface of the base or on a previously deposited layer;
    providing energy to the material after each layer is deposited, the energy being provided by an energy source that forms an energized beam directed at the material;
    melting the material; and
    allowing the material to solidify to bond the material to the second surface of the base or the previously deposited layer;
    wherein the first surface is opposite the second surface.

11. The method of claim 10, wherein the heating step is carried out by a plurality of heating elements configured and arranged to fit within and/or extend along a length of the base.

12. The method of claim 10, wherein the heating step includes heating the base to 100 to 200 degrees Celsius greater than ambient temperature prior to the depositing step.

13. The method of claim 10, wherein the heating step includes heating the base to a temperature such that a difference between the temperature of the base and a melting temperature of the material being applied to the base is reduced to 100 to 200 degrees Celsius.

14. The method of claim 10, wherein the energy source is selected from a group consisting of a laser and an electron beam.

15. The method of claim 10, further comprising:
    monitoring heat of the base to determine a temperature of the base prior to the depositing step.

* * * * *